US006585592B1

(12) United States Patent
Crumby

(10) Patent No.: US 6,585,592 B1
(45) Date of Patent: Jul. 1, 2003

(54) NON-BANKED GAMING SYSTEM

(75) Inventor: Hardy Lee Crumby, Fernley, NV (US)

(73) Assignee: IGT, Reno, NV (US)

( * ) Notice: Subject to any disclaimer, the term of this patent is extended or adjusted under 35 U.S.C. 154(b) by 0 days.

(21) Appl. No.: 10/243,582

(22) Filed: Sep. 13, 2002

Related U.S. Application Data

(63) Continuation of application No. 09/528,125, filed on Mar. 17, 2000, now Pat. No. 6,471,591.

(51) Int. Cl.[7] .......... G06F 17/00

(52) U.S. Cl. .......... 463/26; 463/25

(58) Field of Search .......... 463/25, 26, 27, 463/28, 20, 16, 11, 12, 13; 700/93

(56) References Cited

U.S. PATENT DOCUMENTS 3,697,698 A 10/1972 Oswald et al.
4,991,848 A 2/1991 Greenwood et al.
5,116,055 A 5/1992 Tracy
5,277,424 A 1/1994 Wilms
5,672,106 A * 9/1997 Orford et al. .......... 463/28
5,770,533 A 6/1998 Franchi
5,830,063 A 11/1998 Bryne
6,033,308 A 3/2000 Orford et al.
6,062,981 A 5/2000 Luciano, Jr.
6,110,043 A 8/2000 Olsen
6,152,822 A * 11/2000 Herbert .......... 463/22

* cited by examiner

*Primary Examiner*—Michael O'Neill
*Assistant Examiner*—Julie Brocketti
(74) *Attorney, Agent, or Firm*—George H. Gerstman; Seyfarth Shaw

(57) ABSTRACT

A gaming system is provided which permits the hold value to be determined independently of the distribution of winning outcomes, e.g., to avoid or prevent volatility in the hold value. Preferably each time a wager is placed, a hold value (such as a predetermined and/or fixed percentage) is retained and the remainder is allocated to one or more prize pools. If a pool is too large or too small, or if a pool's rate of growth is too large or too small, the central computer sends a message to all terminals which contribute to the pool, causing the terminals to modify operations so as to bring the pool size or rate of growth to within desired target ranges. Preferably, the current prize amounts corresponding to various potential winning game outcomes are displayed when a game is won, the displayed amount corresponding to the type of win paid. Preferably, a portion of wages is retained as a background amount to at least partially replenish a paid-out prize.

20 Claims, 6 Drawing Sheets

NON-BANKED GAMING SYSTEM

This application is a continuation of application Ser. No. 09/528,125, filed Mar. 17, 2000 now U.S. Pat. No. 6,471,591.

Cross-reference is made to application Ser. No. 08/895,966 filed Jul. 17, 1997; application Ser. No. 09/359,234, filed Jul. 22, 1999 and to application Serial No. 60/022,194 filed Jul. 19, 1996 all of which are incorporated herein by reference.

The present invention relates to a gaming system and in particular to a system in which the prizes are related to the amount of wagers.

BACKGROUND INFORMATION

In a typical gaming system, it is important to avoid the potential for players to predict when a particular gaming terminal will have a win, and thus electronic gaming terminals are typically configured to provide wins on a random or pseudo-random basis, often using a random number generator. Gaming devices typically use some of the wagering revenues to fund prizes, with the remainder (referred to as a "hold") being retained by the casino or other game operator. At least some previous devices, while providing prizes on a random basis, have provided one or more prize payouts which are of a fixed magnitude, i.e., which are predetermined and substantially unrelated to the amount of wagers that have been placed since the last win. For example, in a video poker device, a machine may be configured to output a fast prize amount in response to a hand which has a pair and a second prize amount in response to a hand which has three of a kind, and so forth. The prize amounts corresponding to each winning hand are, typically, predetermined and constant. In a slot machine game, jackpots or other prizes are paid upon obtaining particular reel combinations. Typically, such gaming devices are configured so that on average (i.e., over a relatively long period of time, which may encompass many games, a number of which may be winning games) the amount of hold for a terminal will approach a predetermined target average hold. However, over a relatively short range (e.g., over a period representing two or three wins), the amount of hold for a machine, will typically be quite volatile. This is particularly true when the hold is considered on the basis of the ratio of the money which is held since the last prize to the total amount wagered since the last prize.

Many previous systems which have provided for random wins have involved a banked game, i.e., a game in which players compete against the house (or "bank") for a prize. This is at least partly because wins which are randomly distributed will occasionally occur close together, so that a subsequent prize is not fully funded by wagers that have been placed since the previous prize. In general, in a banked game, the game operator or "house" is at least theoretically at financial risk with respect to winnings. In contrast, a non-banked game provides a fixed fee or percentage of game wagers or revenues to the game operator or "house" with all remaining (nonhold) funds being used to pay winning players. In a non-banked game the game operator never has a financial interest in the revenues which are in excess of the fixed fee or percentage hold and thus the game operator is never at financial risk with respect to winnings by players.

Some previous gaming systems have included a feature which provides for a so-called progressive prize which increases in value as more players wager to win the prize. However, such previous devices have been implemented so that players wager for non-progressive (and, typically, banked) prizes at the same time that they are playing a "progressive" game and thus these devices still have at least some banked aspects.

The ability to provide completely non-banked games can be especially advantageous because at least some jurisdictions restrict some or all gaming to only non-banked games. However, it is believed that players generally prefer gaming which appears, from the player's perspective, to operate substantially as players are accustomed to, which, in general, means players prefer gaming which appears to operate substantially in the fashion that traditional banked gaming operates.

Accordingly, it would be useful to provide a gaming system which avoids and, preferably substantially eliminates, banked gaming, but which preferably closely resembles the perceived play action associated with banked gaming such as banked slot machine, card machine or other gaming. It would be useful to provide a device which can be implemented as a non-banked game, i.e., in which there is not a potential for prizes which have not already been substantially "covered" by previous wagers.

SUMMARY OF THE INVENTION

According to the present invention, a gaming system is provided in which the total of all prizes of the game are covered by (i.e., do not exceed) previously-placed wagers, less a hold portion of the wagers. In one embodiment, for each wager placed by a player, a certain portion is allocated for the hold and the remainder is allocated to one or more multi-terminal prize pools. Each prize pool represents amounts available for paying out prizes won in any of a plurality of gaming terminals. Preferably, each group of gaming terminals which pays out prizes based on a one or more common pools are terminals of the same denomination (i.e. the same minimum wager). Information about the prize pools is preferably maintained in a central computer. From time to time, the central computer will perform an evaluation on the prize pools, e.g. to determine if any prize pools are too large or too small and/or if any prize pools are changing (increasing or decreasing) too rapidly. If a prize pool is too large or is changing too rapidly, the central computer will calculate a value intended to bring the prize pool within the desired size or growth rate range, such as by increasing or decreasing the size of at least some prizes and/or changing the odds of winning (such as by commanding gaming terminals to use a different virtual reel mapping or other odds-affecting data or procedures). The information or commands calculated or selected by the central computer are then communicated to a plurality of individual gaming terminals (preferably all terminals contributing to the prize pool) and implemented to change the size of prizes and/or odds of winning in the individual gaming terminals in a manner so as to affect the common prize pools in the desired fashion.

DETAILED DESCRIPTION OF THE PREFERRED EMBODIMENTS

Figure 1A:
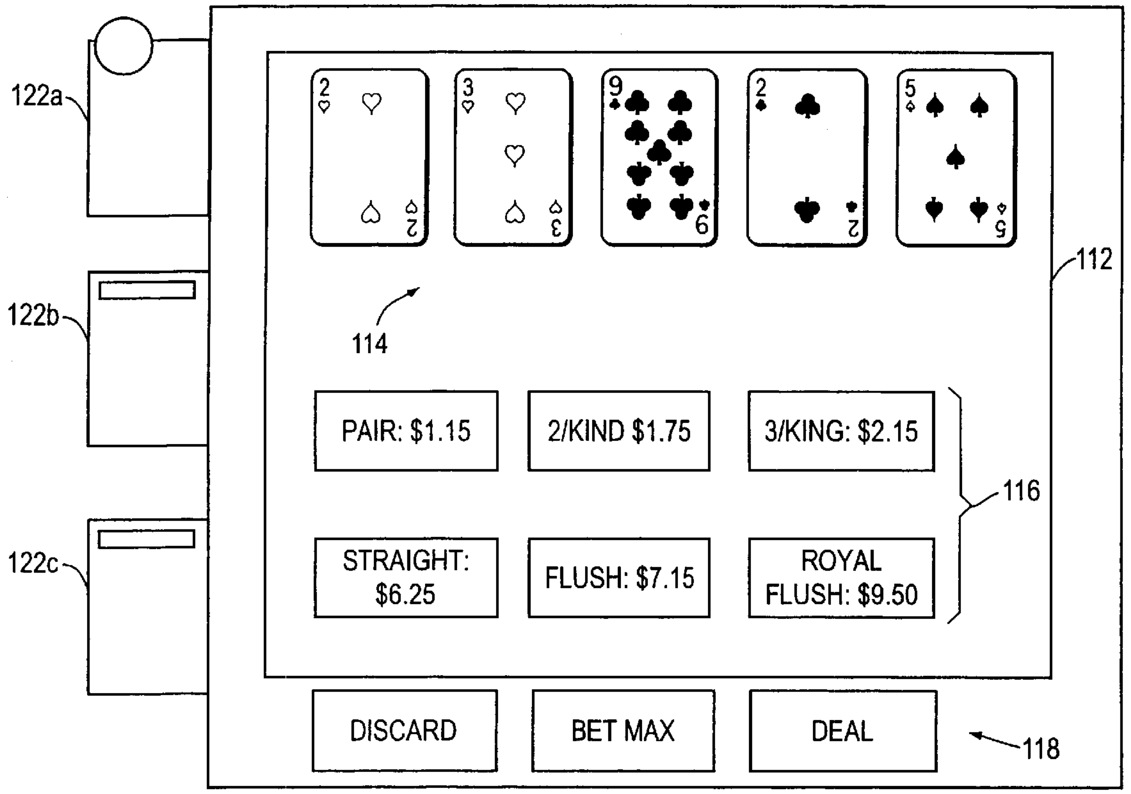
FIG. 1A is a simplified view of a video gaming terminal that can be used in connection with an embodiment of the present invention.
Figure 1B:
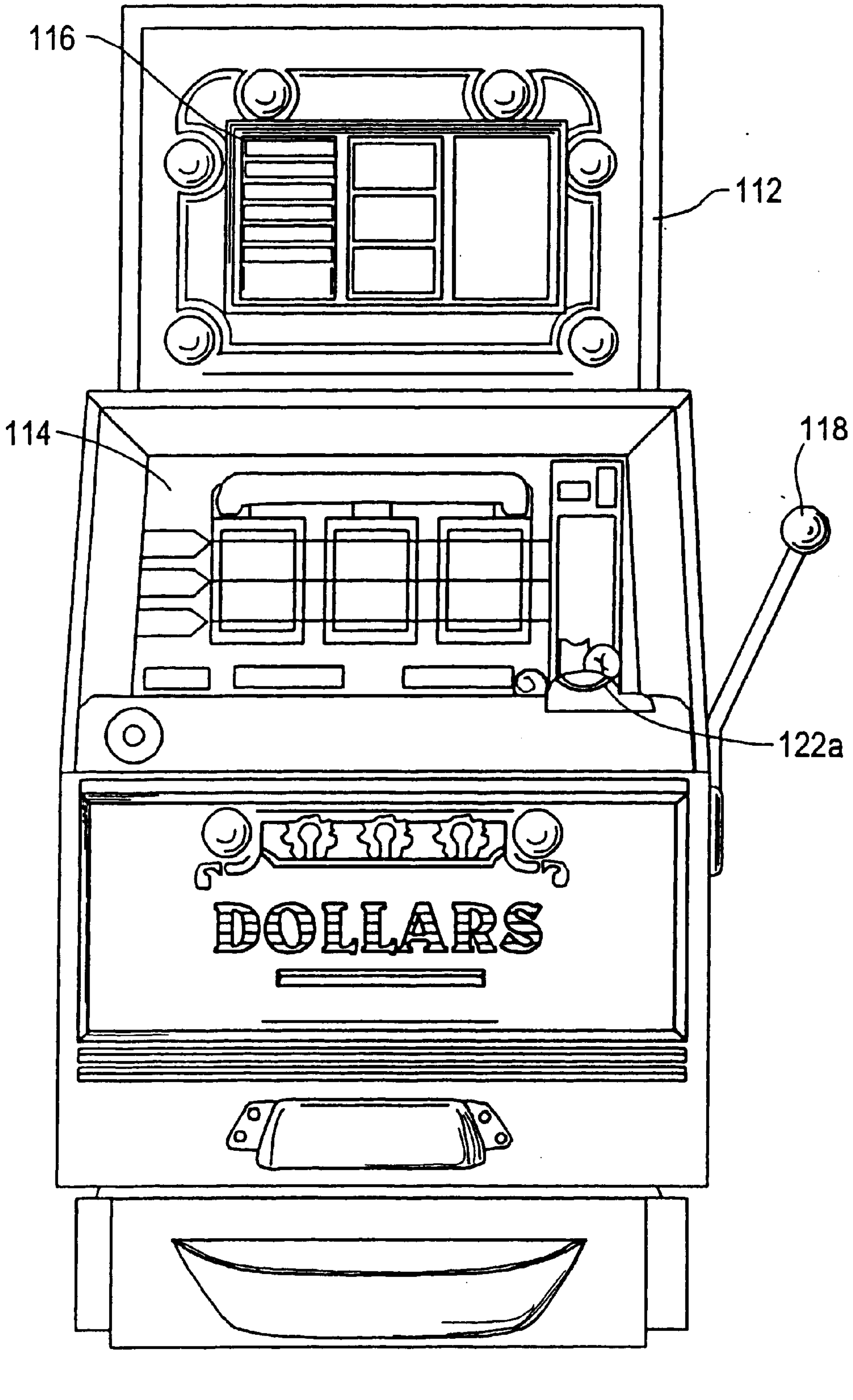
FIG. 1B is a simplified view of a simulated slot machine terminal that can be used in connection with an embodiment of the present invention.

FIGS. 1A and 1B depict gaming terminals which can be used according to embodiments of the present invention. The gaming terminal includes a display screen 112 which has a first portion 114 for displaying the game such as displaying cards (FIG. 1A, in the case of a video poker or other electronic card game), simulated slot machine reels (FIG. 1B, for use in connection with an electronic slot machine), a number grid (e.g., for use with a keno game terminal) or the like. Preferably the gaming terminal also displays an indication of the current value or payout associated with various winning game outcomes such as winning poker hands, winning slot machine reel symbol combinations and the like. In the embodiment of FIGS. 1A and 1B, the winning payouts are displayed in a portion 116 of the display screen. However, it is also possible to provide a separate display such as a CRT, LCD or similar display indicating the amount for one or more of the potential prizes. When one or more prizes are unchanging, graphical displays, e.g. on a gaming terminal surface can be provided. Various input/output devices are also provided which may include, e.g., a button panel 118 for authorizing or placing wagers, requesting a deal of cards (FIG. 1A), a spin of simulated slot machine reels (FIG. 1B), and the like. Other types of input devices may be used such as a touch screen input, mouse, joystick, keyboard and the like. Also depicted in FIGS. 1A and 1B are wager acceptors such as coin, bill and card acceptors 122*a,* 122*b,* 122*c,* e.g., for permitting players to place wagers.

Figure 2:
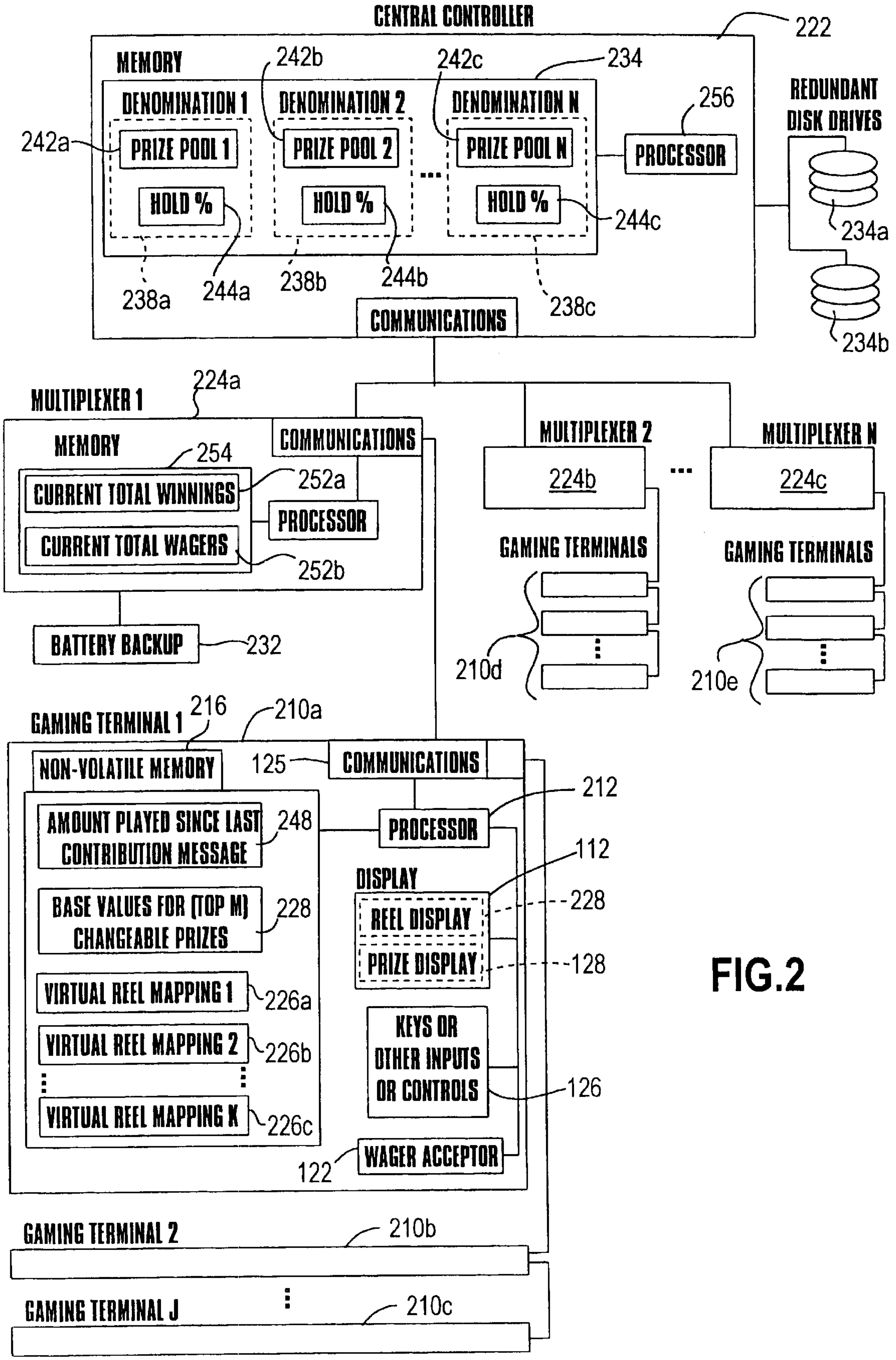
FIG. 2 is a lock diagram of a computing system which can be used in connection with controlling a terminal in accordance with one embodiment of the present invention.

In one embodiment, as depicted in FIG. 2, a gaming system can include a plurality of gaming terminals 210*a* through 210*e.* The gaming terminals 210*a* through e are connected to a central controller 222. Although it is possible to provide a direct connection from gaming terminals 210 to the central controller 222, in the depicted embodiment, a plurality of multiplexers 224*a,b,c* each couples a group of gaming terminals to the central controller. For example, in the depicted embodiment, the first multiplexer 224 couples a first group of gaming terminals 210*a,* 210*b,* 210*c,* a second multiplexer 224*b* couples a second group of gaming terminals 210*d* and a third group of multiplexers 224*c* couples a third group of gaming terminals 210*e.* If desired, the multiplexer 224 can be computers, with appropriate communication models and programming.

Preferably, the gaming system includes a plurality of different features intended to avoid loss of important data for functionality, e.g. in case of a power loss or other malfunction. For example, in the depicted embodiment, the multiplexers 224 are preferably provided with battery back-up 232. The central controller 222 is preferably provided with redundant disk drives 234*a,b* for storing important data.

The gaming terminals, in addition to including a display 112, preferably including a changeable prize display 128, inputs 126 wager acceptors 122, communications module 125 and the like (generally as described above) is provided with a processor 212 (typically a microprocessor or similar computer system) which is coupled to, among other items, a (preferably non-volatile) memory 216. In the embodiment illustrated in FIG. 2, the gaming terminal 210*a* is configured to include a slot machine-type game and the non-volatile memory 216 stores a plurality of different virtual reel mappings 226*a,* 226*b,* 226*c.* At any one time, only one of the virtual reel mappings 226*a,b,c,* is in effect. Each reel mapping defines a correlation between a plurality of virtual reel stop positions and a different (typically smaller) plurality of displayable reel stop positions or symbols which can be displayed on a reel display 228 (which may be either an electronic display 112 or a traditional physical reel display). The mapping defined by each of the virtual reel mappings 226*a,b,c* determines the probabilities of occurrence of various winning combinations (i.e. winning reel stop positions). For example, if the first reel mapping 226*a* has five different virtual reel stop positions, each of which maps onto, for example, a three-cherry winning reel display 228, and if the second virtual reel mapping 226*b* contains only three virtual reel stop positions which map onto a three-cheery winning display, then the slot machine game as played on gaming terminal one 210*a* will provide a higher probability for receiving the prize associated with a three-cherry stop position if the fast virtual reel mapping 226*a* is in effect, compared to the probability when the second virtual reel mapping 226*b* is in effect. Accordingly, a process of selecting which virtual reel mapping 226*a,b,c* in effect determines the win probabilities for some or all prizes of the gaming terminal 210*a* (e.g. as described below). For example, in one embodiment, a gaming terminal might have seven sets of reel mapping stored, including a normal or nominal reel mapping(defining normal odds of winning), three reel mappings having greater-than-normal odds for winning and three reel mappings having lower-than-normal odds of winning.

In some (but not necessarily all) embodiments, some or all of the prize values in the gaming terminals 210 are changeable, e.g. as a function of the magnitude of various prize pools, as described below). There are a number of different ways in which the current amount of a prize associated with various winning outcomes can be calculated or displayed. In the embodiment of FIG. 2, the gaming terminals store, in non-volatile memory 216, base values for at least some of the prizes 228, such as the top M prizes (where M can be any value, but will typically be between 1 and 5). The base values 228 can then be modified, e.g. by multiplying the base values 228 by a multiplier. For example, if the multiplier is 2, the prizes, as displayed on the prize display 128 will be twice the base values 228.

Although it is possible to define a single prize pool, or a single set of prize pools, for use by all gaming terminals, for all games, it is preferred, as illustrated in FIG. 2, to provide different prize pools (or sets of prize pools (defined by information stored in the memory 236 central controller 222)) with different prize pools being defined for different game denominations (e.g. nickel games, quarter games, dollar games, etc.) 238*a,b,c.* which may be stored, e.g. in a location 248 in non-volatile memory. Each denomination 238*a,b,c* is preferably not only associated with its own prize pool (or set of prize pools) 242*a,b,c,* but preferably can have different hold percentages defined 244*a,b,c* for each denomination.

Figure 3A:
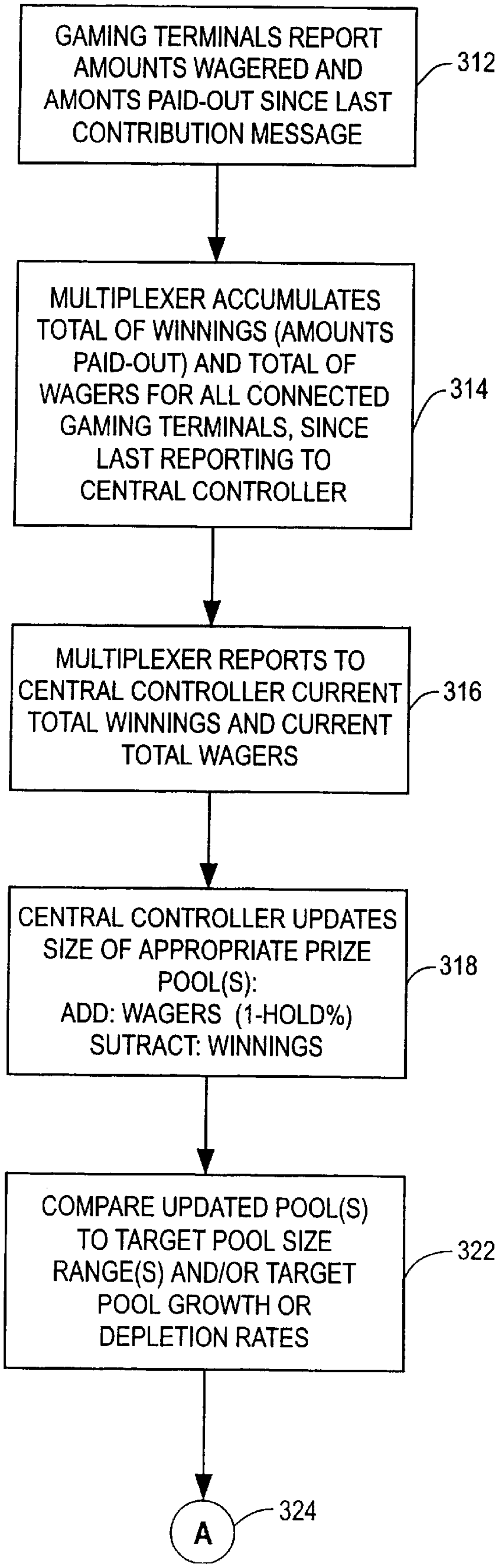
FIGS. 3A, B, and C are flow charts depicting procedures for using the gaming system according to embodiments of the present invention.
Figure 3B:
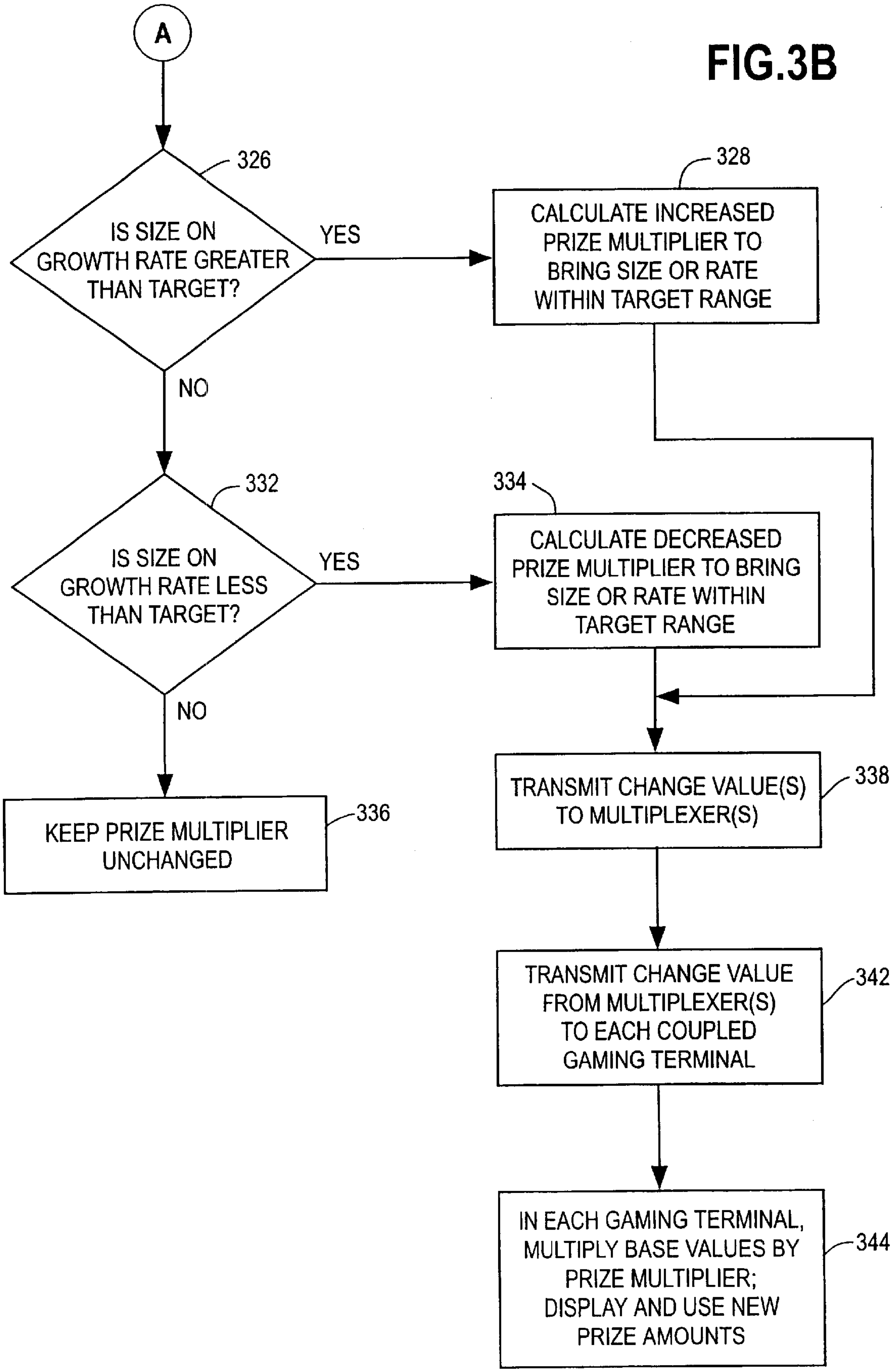

In practice, as depicted in FIG. 3A, that frequent or periodical intervals, (such as about once per second) the gaming terminal identification and the amounts paid out by that gaming terminal since the last contribution message (i.e. the last message reporting on such contributions) may be sent to the central controller. The reporting can be done in a polled fashion (i.e. in response to a request sent from a multiplexer or the central controller) or can be done in an interrupt fashion (with the gaming terminal sending an interrupt request and then sending a message with the necessary information after the request is acknowledged. Each multiplexer 224*a, b, c* (if provided) accumulates 314 the total amount of the winnings and the total amount of the wagers for all of the connected gaming terminals, storing in locations 252*a, b* and memory 254 the amounts accumulated since the last time these amounts were reported to the central controller. Frequently, or periodically, the multiplexers 224*a,b,c* report 316, to the central controller 222, the current winnings 252*a* and current total wagers 252*b*. The central controller 222 uses this information to update 318 the size of the appropriate prize pools 242*a,b,c*.

In one embodiment, each prize pool 242*a,b,c* is updated by adding the amount of the new wagers 252*b* diminished by the hold amount. For example, if, for a given denomination 238*a*, the amount of wagers made at all such denominated terminals since the last reporting totaled $100.00 and if the hold percent is 10 percent, then the prize pool 242*a* would be incremented by $100, times 1.0, minus 10 percent, or $90.00. The prize pools 242*a,b,c* are decremented by the amounts of the winnings that were paid out from those pools.

Preferably the central controller 222 processor 256 can access information, e.g. stored on disk drives 234*a,b,* in memory 236, or otherwise, which indicates target values or target ranges for the size of the various prize pools and/or for the rate of growth or depletion of the prize pools. Preferably the system can be configured such that there are different target values or rates for the different prize pools and/or for the different denominations. If the system includes target values or ranges for growth rates, the processor 256 will calculate the actual growth rate for each of the pools, e.g. as the difference between the new prize pool and the previous prize pool divided by the time elapsed since the last update. The central controller 222 then compares the actual size or growth rate of the updated pools 242*a,b,c* to the target size ranges or growth rates or depletion rates 322.

Actions (if any) which are taken 324 following or in response to such a comparison 322 will depend on the type of prize pool adjustment technique which is used. In one embodiment (generally depicted in FIG. 313) the size of the prizes to be awarded from the various prize pools are increased or decreased in order to bring the prize pools' magnitude or growth rate into desired ranges. In another embodiment, depicted in FIG. 3C, the probabilities of winning outcomes are adjusted in order to increase or decrease the prize win (payout) rate (e.g. compared to the wager rate) to bring the prize pools back into the target ranges. It is also possible to implement embodiments which use both strategies, either simultaneously, or at different times.

In the embodiment of FIG. 313, if it is determined that the prize pool size or growth rate is greater than the target size or growth rate 326, the central controller 222 will calculate (or select from a table) a new multiplier value 328 (i.e. a new value for multiplying the base values 228 in order to arrive at the actual and displayed prize amounts 128). When the size or growth rate of one or more of the pools is higher than the target ranges, multipliers are increased 328 in order to award (on average) relatively larger prizes and thus deplete the prize pool, so as to bring it back into the target range. If the prize pool size or growth rate is less than the target value 332, the processor 256 will calculate a decreased prize multiplier 334 which, again will operate so as to bring the prize pool size or rate within a target range. If the size or growth rate is neither too large nor too small, the prize multiplier is kept unchanged 336. In the embodiment of FIG. 313, changed values for the multiplier are transmitted 338 to one or more of the multiplexers 224*a,b,c* which in turn transmits the values 342 to each of the coupled gaming terminals 210. In each gaming terminal 210, the base values 228 are multiplied 344 by the new prize multiplier and the new prize amounts, thus calculated, are preferably displayed on the prize display 128.

Figure 3C:
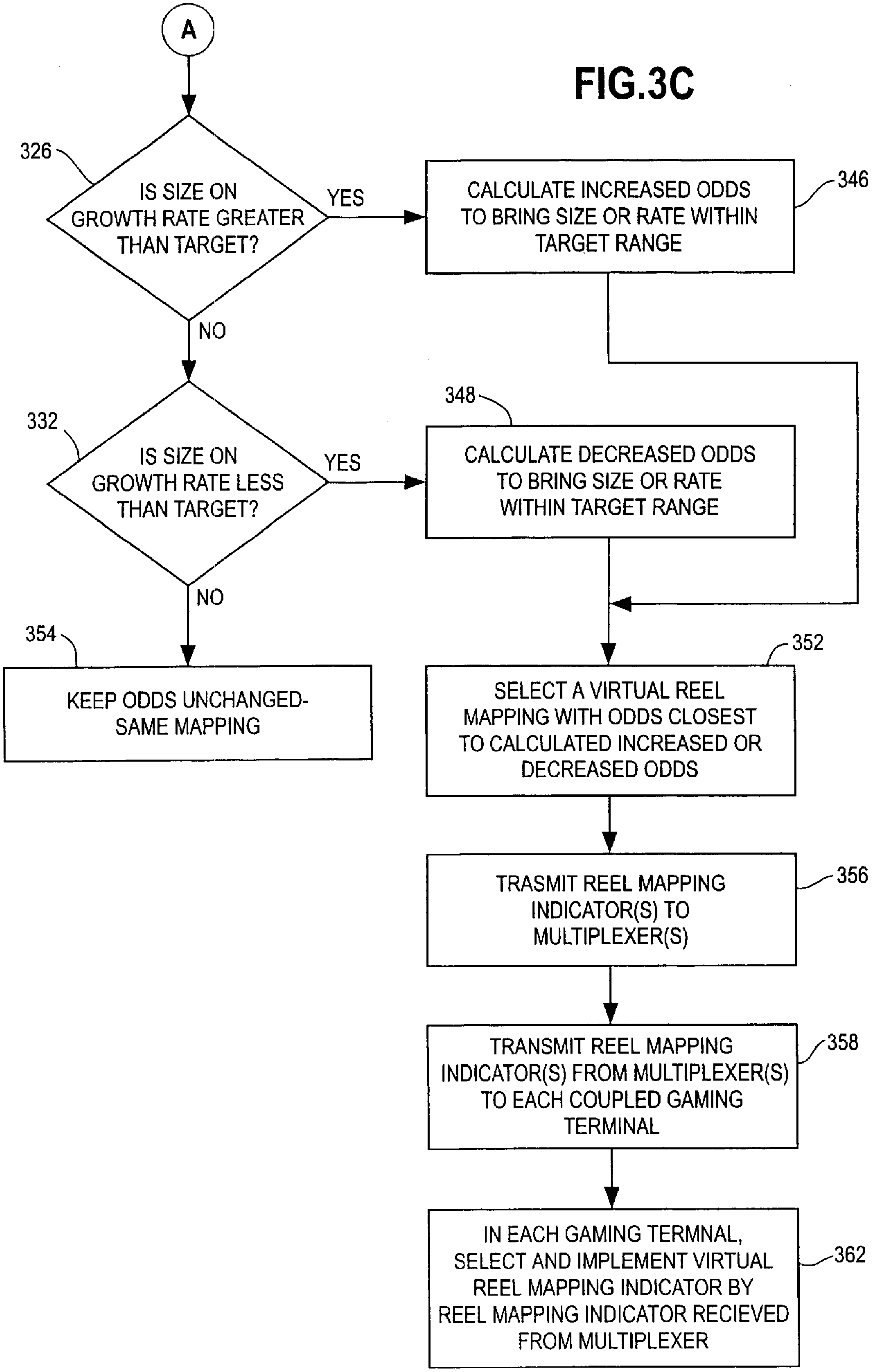

In the embodiment of FIG. 3C if the size or growth rate of the prize pool is greater than the target 326, the processor 256 will calculate (or select from a table) new increased odds of winning 346 which, when implemented, begin a process of increasing the depletion rate, for a prize pool and thus tend, on average, to bring it back within the target range. If the size or growth rate is less than the target 332, the processor 256 will calculate (or select from a table) new decreased odds of winning 348, thus tending, on average, to increase the size of the prize pool so as to bring it within the target range. In the embodiment of FIG. 3C, once the new (increased or decreased) odds have been calculated or selected, the processor 256 will select a virtual reel mapping 226*a,b,c* which results in odds, for the gaming terminal, which are close to the increased or decreased odds 352. Preferably the central controller 222 has information, e.g. stored in disk drives 234*a,b,* indicating, for each gaming terminal or group of gaming terminals, what winning odds will result from implementing each of the reel mappings 226*a,b,c* stored in each of the gaming terminals.

Although FIG. 3C depicts an embodiment which involves two steps and an adjustment decision, namely first calculating either increased or decreased odds 346, 348 and then selecting a virtual reel with a closest mapping 352, other embodiments are possible. For example, in response to determining that a size or growth rate exceeds a target 326, the process 256 can merely send a signal indicating that the terminal or terminals should select whichever virtual reel mapping has the next-lower odds of winning.

If the size or growth rate is neither greater than nor less than target ranges, then the odds or the reel mapping is kept unchanged 354. At least in the case of a changed reel mapping, the new reel mapping (or an indicator or identifier of the desired reel mapping) is transmitted to the multiplexers 225 which, in turn, transmit the reel mapping indicators to each coupled gaming terminal 358. In each gaming terminal, the indicated new reel mapping 226 is selected 362 and implemented.

The invention, at least as depicted in FIGS. 2 and 3A through 3C, is believed to represent an efficient and feasible system, at least partially because the system uses a single central controller 222 to perform analysis and make decisions which are then conveyed and implemented, preferably in a plurality of different gaming terminals 210. For example, in one embodiment, a single central controller 222 can, substantially instantly and reliably, implement desirable changes, for bringing pools within target ranges, among a plurality of gaming terminals, all at (substantially) the same time, such as adjusting odds or prizes (or both) for all machines of a given denomination, throughout an entire casino floor.

In light of the above description, a number of advantages of the present invention can be seen. The present invention can implement a non-banked gaming system which can define prize pools that are maintained in desired target ranges or growth rates, preferably substantially simultaneously, throughout an entire casino floor or other group of gaming terminals. The system allows for all prizes to be funded from player pools which preferably are one-time-only seeded (e.g. when the games are initially implemented). The present system can readily accommodate a system in which different gaming terminals have different denominations (e.g. minimum accepted coin). For example, the system can provide for different hold percentages for each different denomination, and/or can provide for different prize pools (or sets of prize pools) for each denomination. For example, the hold percentage for each denomination might be different because a separate player-fund pool is maintained for each denomination. If desired, the present system can provide for adjusting only certain ones, of all available prizes, such as the prizes with the highest monetary award value preferably as a function of the value of the appropriate player fund pool for corresponding denominations. Because the size of the prizes can be adjusted, various objectives can be met. For example, in one embodiment, the highest award value prizes can be configured to collectively contribute the same total fixed percentage to the player payback percentage, e.g. to ensure a substantially equal opportunity to win (at least some prizes) for all players on all games. By using a multiplier of a base value to determine prize amounts, it is possible to provide for values of prizes which vary widely from game to game (e.g. as may be desired to enhance player interest or entertainment value) but in which, nevertheless, the value can be adjusted up or down e.g. by a percentage based on the current monetary size of the appropriate player fund pool. Because credits played and credits won are stored in non-volatile memory, these values can be retrieved (e.g. through maintenance procedures) and used as necessary (e.g. added to the appropriate player fund pool) even if the terminal should become non-operable. Preferably, in the event of loss of communication, gaming terminals would finish any ongoing game and then discontinue operation until communications is restored. By providing for multiple multiplexers, communication multiplexers can be installed within relatively close proximity to the gaming terminal, thus helping to avoid connection disruptions. The system preferably provides for various types of reporting such as end-of-day and weekly/monthly prize pool reports. Preferably reports, such as end-of-day reports, pertaining to individual terminals and game play activities, can be used to provide required jurisdictional reports as well as desired or necessary casino floor management and trend analysis. The various prize pools and analysis and calculation as described are preferably substantially implemented by the manner in which the processor of the central controller 222 is programmed and new denominations, new prize pools, or modifications thereof, can be made to the system relatively readily, such as by adding or modifying software. Preferably the central system is configured with sufficient redundancy to provide a high degree of fault tolerance and reduce or eliminate the potential for loss of critical data. In one embodiment, player prize pool values are calculated based on the previous pool value, plus a new money played, minus money won, minus an operator fee (e.g. percent of money played). Preferably the system ensures that the player fund pools always remain above the initial seed value. The new player fund pool can be used to determine a new percentage of initial pool seed value. Such percentage can be used to adjust the current value of the top awards.

The present invention provides for a gaming system that achieves substantially unpredictable, such as random, win distribution while permitting the system to achieve a substantially constant, non-volatile hold percentage, even when the hold percentage is considered on a win-to-win basis. The present invention permits the implementation of a system which contains no banked games, i.e., in which all prizes (even those resulting from wins which, through the operation of randomness, occur relatively close together) are funded entirely by previous wagers rather than requiring the house or "bank" to cover prizes (except perhaps, for initial seeding). The present invention permits a gaming system to be implemented in which all prizes can increment through time, as multiple wagers are placed, which is believed to add to the entertainment value and interest in the game.

A number of variations and modifications of the invention can also be used. Although the invention has been described in terms of gaming terminals such as may be found in casinos, the invention can also be implemented on other types of devices such as desktop or laptop personal computers, including those communicating over groups of networks such as the Internet. The present invention permits effective control over the hold value. Although it is anticipated that this control will be used to establish a substantially stable or constant hold, this control could also be used to implement a hold value which varied, e.g., for marketing purposes (such as at different times of the day, or in different locations, or in response to the current prize amounts or configurations). Freeing the hold value from volatility which is based on the randomness of the win distribution permits the system to be configured such that the hold can be controlled in any of a variety of fashions, whether a constant hold is desired or some changeable hold, e.g., for marketing purposes. In one embodiment, the present invention can be implemented in a fashion such that one or more of the prize amounts are changed in response to wagers at two or more networked gaming terminals. Typically, the number of terminals which are pooled together will be related to the wager-to-prize ratio. It is also possible to provide a hybrid gaming terminal in which some prizes are implemented in a stand-alone fashion and other prizes are implemented using local, casino-wide or wide area links. Other groupings and communication links can also be provided as will be apparent to those of skill in the art after understanding the present invention.

It is possible to provide configurations with a single prize meter, with a predetermined percentage of the prize to be awarded depending on the type of winning outcome which is achieved (e.g., two-of-a-kind results in 5% of the amount in the prize meter, royal flush results in 90% of the amount in the prize meter), and/or depending on the denomination of the gaming terminal (e.g. 60 percent of the prize meter being allocated to $2 machines and 40 percent being allocated to $5 machines). Although embodiments of the present invention were described in connection with a reel game, the invention can also be implemented in connection with other types of games including electronic poker games, electronic keno games, or other card games, or similar games. For example, for a card game, rather than selecting a virtual reel mapping, the system can provide virtual card deck mappings and the like. It would be possible to implement an embodiment in which each gaming terminal stored only a single virtual reel mapping **226*a* and, whenever it was desired to change winning odds, an entirely new virtual reel mapping could be downloaded, from a multiplexer 224 (or a central controller 222), for storage and use in the gaming terminal. However, it is believed that by storing a plurality of reel mappings 226*a,b,c*** and downloading only instructions regarding which reel mapping to choose, the bandwidth necessary to implement the present invention can be kept relatively low. It is also possible to effectively modify reel mapping, such as by adding new mapping elements (or removing from) a "base" mapping.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g. for improving performance, achieving ease and/or reducing cost of implementation. The present invention includes items which are novel, and terminology adapted from previous and/or analogous technologies, for convenience in describing novel items or processes, do not necessarily retain all aspects of conventional usage of such terminology.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

That which is claimed is:

1. A method for non-banked gaming, which comprises:

communicating at least one game terminal to a central controller defining a plurality of prize pools in an electronic memory of the central controller;

playing wagering games using said terminals;

varying the values of said prize pools in response to communications from the gaming terminal in a manner responsive to amounts wagered and amounts won in said games;

determining whether at least one of said prize pools is within a target range; and altering at least one parameter of the game being played when the at least one prize pool is not within said target range to have the effect of bringing said one prize pool within said target range.

2. The method of claim 1 in which said altered parameter comprises the odds of obtaining a winning outcome.

3. The method of claim 1 in which said altered parameter is a magnitude of said prize pool.

4. The method of claim 1 in which said altered parameter comprises a growth rate of said prize pool.

5. The method of claim 1 in which said altered parameter comprises a depletion rate of said prize pool.

6. The method of claim 1 in which a plurality of said game terminals are communicated to the central controller.

7. The method of claim 1 in which at least the first prize pool is used for awarding prizes in a first subplurality of a plurality of said gaming terminals having a first denomination, and a second prize pool is used for awarding prizes in a second subplurality of said plurality of gaming terminals having a second denomination different from said first denomination.

8. The method of claim 1 in which said altered parameter comprises increasing or decreasing at least a first prize amount.

9. The method of claim 1 in which a plurality of said game terminals communicate with said central controller and in which at least some of said plurality of gaming terminals includes a memory device storing a plurality of mappings from a first set of data to a set of game outcomes and wherein said altered parameter comprises the selection of one of said mappings not in current use.

10. The method of claim 1 in which said target range is substantially a single target value.

11. The method of claim 1 further comprising reporting any of:

the values of the prize pools;

a target range;

amounts wagered;

amounts won; and the at least one parameter altered.

12. A method for non-banked gaming, which comprises:

communicating at least one game terminal to a central controller defining a prize pool in an electronic memory of the central controller;

playing wagering games using said terminal;

varying the values of said prize pool in response to communications from the gaming terminal in a manner responsive to amounts wagered and amounts won in said games;

determining whether said prize pool is within a target range; and altering at least one parameter of the game being played when the prize pool is not within said target range to have the effect of bringing said prize pool within said target range.

13. Apparatus for a non-banked gaming system comprising:

at least one game terminal comprising at least one game having at least one winning outcome, and at least one parameter affecting payout of said winning outcome of said game;

at least one prize pool having a size;

at least one target range for said prize pool;

means for comparing said prize pool with said target range;

means for altering said parameter when said prize pool is not within said target range.

14. The apparatus of claim 13 where said parameter is a probability of winning said game.

15. The apparatus of claim 13 where said parameter is a probability of losing said game.

16. The apparatus of claim 13 where said parameter is a magnitude of said prize pool.

17. The apparatus of claim 13 where wagers lost and wagers won affect the prize pool size.

18. The apparatus of claim 13 further comprising a plurality of game terminals connected to a central controller.

19. The apparatus of claim 13 further comprising means for altering said parameter to move said prize pool within said target range.

20. The apparatus of claim 13 whereby altering said parameter increases or decreases said winning outcome.

* * * * *